United States Patent [19]

Gain, Jr.

[11] Patent Number: 4,653,531
[45] Date of Patent: Mar. 31, 1987

[54] SUPPORT FOR UNDERGROUND VALVE INDICATOR

[75] Inventor: Lorand H. Gain, Jr., Montgomery, Ill.

[73] Assignee: AMSTED Industries Incorporated, Chicago, Ill.

[21] Appl. No.: 892,368

[22] Filed: Aug. 4, 1986

[51] Int. Cl.$^4$ .................... F16K 37/00; F16M 11/26
[52] U.S. Cl. .................................... 137/556; 137/315; 116/277; 248/188.5
[58] Field of Search .............. 137/556, 315, 553; 248/333, 188.5; 116/277

[56] References Cited

U.S. PATENT DOCUMENTS

| | | | |
|---|---|---|---|
| Re. 28,069 | 7/1974 | Fortune et al. | 116/277 |
| 298,257 | 5/1884 | Vail | 248/188.5 |
| 1,386,065 | 8/1921 | Lofton | 116/277 |
| 4,448,148 | 5/1984 | Gain, Jr. | 116/277 |
| 4,497,340 | 2/1985 | Gain, Jr. | 116/277 |

Primary Examiner—A. Michael Chambers
Attorney, Agent, or Firm—Charles E. Bouton; Edward J. Brosius

[57] ABSTRACT

An improved post support for a valve position indicator of an underground valve. The post support includes two telescoping sleeves of which one sleeve is provided with two sets of a plurality of aligned equispaced openings located in 180° angularly spaced relationship. The sets of opens are lengthwise of set so that the centers of the openings of one set lie midway between the centers of the other set. The other sleeve is provided with 180° angularly spaced openings linearly spaced a distance equal to one half the spacing between the openings of the two sets. Relative rotation of the telescoping sleeves and length displacement permits an adjustment of the length equal to the linear spacing of fastening means.

5 Claims, 2 Drawing Figures

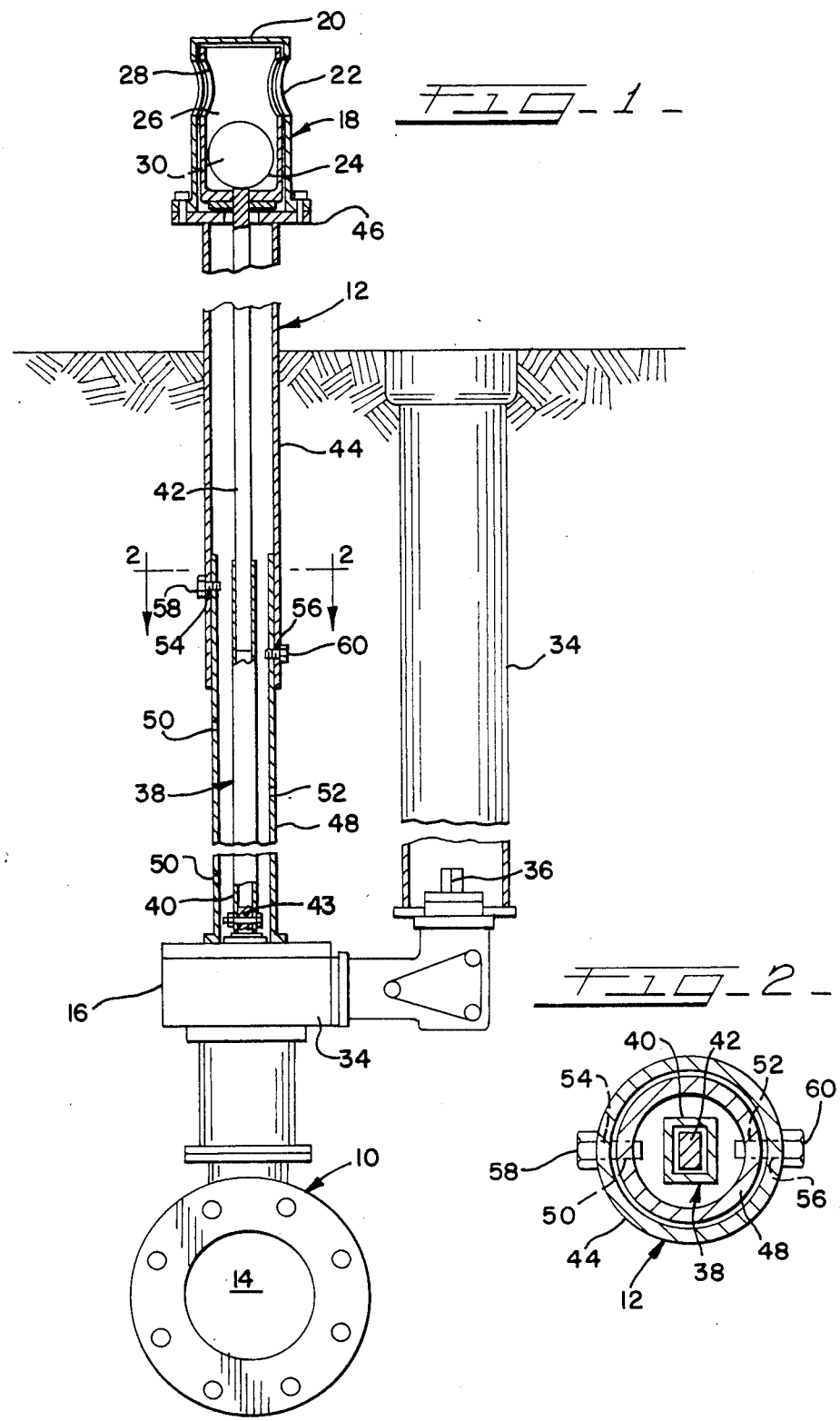

SUPPORT FOR UNDERGROUND VALVE INDICATOR

The present invention relates to underground butterfly valves and more particularly an improved adjustable support for an indicator assembly for visually determining the open or closed position of the buried valve.

Underground valves of the type to which the present invention relates are frequently used in emerging water systems such as sprinkler systems and are separately installed from the water supply used in commercial and residential structures. Especially when used in a fire sprinkler system it is essential that the water source be controlled from the exterior of the structures. Such systems are installed in various locations and under conditions such that the burial depth requirement may vary from location to location.

The underground valves are provided with visual indicators showing whether the valve is open or closed. The indicators extend a sufficient distance above ground level so that the indicators may be observed from a distance. Normally such indicators have an outer housing including diametrically opposed openings, and an inner shade disposed between the openings and operatively connected for turning with the butterfly valve. In the valve open position the shade is generally located so as to permit sight through the two diametrically opposed housing openings. In the closed position of the valve the shade is turned so as to obstruct sighting or viewing through the housing openings.

With this type of indicator arrangement it must be sufficiently spaced above the ground level so that the sighting through the openings is unobstructed and no misreading can occur. Primarily for facilitating this observation and to accommodate a range of burial depths the valve position indicator support structure should be adjustable to accommodate the various terrain conditions which may be encountered at the installation.

One such effort to render the visual valve indicator support adjustable is illustrated in U.S. Pat. No. 3,693,647 dated Sept. 26, 1972 and assigned to the assignee of the present invention. Further details of a valve indicator are shown in U.S. Pat. No. 3,452,766 also assigned to the assignee of the present invention. The structures of those patents are incorporated herein by reference thereto.

SUMMARY OF THE INVENTION

By the present invention it is proposed to provide an improved visual indicator supporting column or post.

This is accomplished by providing an underground valve assembly having a variable valve position with a telescoping tubular post on which the indicator housing is fixedly mounted. A telescoping indicator actuating shaft is operatively connected between the valve and the indicator shade and serves to turn the indicator shade as the valve is moved between its open and closed positions. In the open position the shade permits sighting through the housing and in the closed position such sighting is blocked by the shade.

The telescoping tubular post includes an inner and outer telescoping members of substantial circular cross section to permit relative rotation as well as lengthwise movement. A set of lengthwise aligned openings having the centers thereof equispaced a predetermined distance are provided on the inner member which is mounted on the valve body. A second set of lengthwise aligned openings angularly spaced 180° from the first set is also found on the inner member. The centers of the second set of openings are spaced equally to the first set but are located to lie substantially midway between the opening center of the first set of openings so as that the oppositely disposed openings lie in a staggered relationship equal to one half the predetermined spacing between the centers of the first and second openings.

The outer member is formed or provided with two fastening openings of which are angularly spaced 180° and the center is lengthwise spaced one half of the predetermined spacing between the openings of the two sets on the inner member. Fastening means are secured to the outer tubular member openings and insertable into adjacent ones of the staggered openings of the sets of openings on the inner member.

Lengthwise movement of the outer and inner members allows adjustments of the post length in increments equal to the distance between the predetermined spacing between the centers of the respective first and second sets. Adjustment of the post length in an increment distance of one half the distance of the predetermined spacing between centers is possible by rotating either member 180° and sliding the outer member relative to the inner to align the fastening openings with adjacent ones of staggered openings of the first and second sets.

In the more specific aspects of the invention the telescoping indicator positioning shaft is keyed to prevent relative rotation between the telescoping members thereof.

Further features of the invention will be readily apparent from the following disclosure.

BRIEF DESCRIPTION OF THE DRAWINGS

FIG. 1 is an elevational view of an underground valve installation embodying the structure of the present invention with some of the parts being broken away to show underlying details of structure; and FIG. 2 is a cross sectional view taken generally along the lines 2—2 of FIG. 1.

DESCRIPTION OF THE PREFERRED EMBODIMENT

Referring now to the drawings there is shown an underground valve assembly 10 embodying the valve position indicator support arrangement 12 of the present invention.

The underground valve assembly 10 comprises generally a rotary valve 14, such as a butterfly valve, an actuator 16 for opening and closing the valve 14 and the valve position indicator support arrangement 12 for the valve position indicator 18.

The valve position indicator 18 includes generally a housing 20 mounted on the support assembly arrangement 12. The housing includes two pairs of diametrically opposed and vertically spaced openings 22-22 and 24-24 with the pairs arranged at right angles relative to each other. The right angular relationship permits sighting of the valve position from right angularly located positions.

Disposed within the housing 20 and turnable therein is a shade 26 also having diametrically opposed and vertically spaced openings 28-28 and 30-30. The pairs 28-28 and 30-30 are located at right angles relative to each other. The shade is turnable between a position in which the pairs of shade openings 28-28 and 30-30 are in alignment with the respective pairs of openings 22-22 and 24-24 whereby sighting is possible through the housing to indicate the valve open position.

When the shade 26 is turned so that the openings no longer align the sighting is blocked and the valve is then in the closed position. The visual valve position indicator is operatively connected to the valve 14 and/or the valve actuator 16.

In the embodiment shown the valve actuator 16 extends from the bottom of a buried access pipe 34 at the lower end of which there is located an operating nut 36. A socket wrench may be inserted into the pipe 34 and seated over the nut 36 to rotate the latter. Rotation of the nut 36 operates to turn the valve through drive mechanism (not shown) more fully described in said aforementioned U.S. Pat. No. 3,693,647 and U.S. Pat. No. 3,452,766.

Movement of the valve is transmitted from the valve 14 to the shade 26 by means of a telescoping valve indicator shaft assembly 38. The indicator shaft assembly 38 includes a pair of telescoping members 40 and 42.

The members 40 and 42 preferably are each of substantially rectangular cross section whereby the members 40-42 are keyed against relative turning while freely permitting lengthwise extension or contraction. In the embodiment shown the inner member 42 is of substantially solid rectangular bar and extends and is fixed to the base of the visual indicator shade 26 so as to rotate the latter within the indicator housing 20.

The outer telescoping member 40 is of generally rectangular tubular structure and slidingly receives the solid bar 42. At its lower end the tubular member 40 receives the end of a stub shaft 43 connected to and reflecting the position of the butterfly valve 14. The tube 40 may be fastened to the stub shaft 43 by means of a bolt or pin or the like.

The indicator shaft assembly 38 thus reflects the position of the butterfly valve 14 when the latter is turned. The indicator will be positioned such that the shade openings 28-28 and 30-30 are aligned respectively with housing openings 22-22 and 24-24 so as to indicate the valve as open and when the openings 22-22 and 24-24 are obstructed by the shade the valve as closed.

The telescoping indicator support assembly or post generally 12 includes an outer tubular sleeve or member 44 to the upper end of which there is fixed as by welding a platform 46 to which the indicator housing 20 is bolted. An inner tubular sleeve or member 48 is slidably received within the outer sleeve 44. The sleeves 44 and 48 are of circular cross section or cylindrical to permit relative turning for reasons which will be more fully explained hereinafter.

To selectively adjust the length or height of the telescoping tubular support post 12, the inner tubular member is provided with a plurality of fastener openings arranged in two longitudinally staggered sets e.g. a first set of openings 50 and a second set of openings 52. The first set of openings 50 are aligned and the centers thereof are equispaced a predetermined distance x. The second set of openings 52 are also with the centers thereof equispaced the same predetermined distance x as the centers of the openings 50. The first and second set of longitudinally aligned openings 50 and 52 are angularly spaced 180° and the centers thereof are staggered so that the longitudinal distance between adjacent openings of the two sets is one half x.

The outer tubular member 44 is provided with two staggered fastener openings 54 and 56 which are preferably threaded internally. The fastener openings are angularly spaced 180° and the centers thereof lengthwise spaced a distance of one-half x. Seated in the openings 54 and 56 are fasteners 58 and 60 respectively. The fasteners are adapted to seat in adjacent ones of the staggered set of openings 50 and 52 as shown. In the embodiment shown the fasteners 58 and 60 are threaded bolts which are threaded into the respective opening 54-56 in the outer sleeve 44 and extend into selected openings 50, 52 in inner sleeve 48 so as to hold or retain the post 12 at the desired position.

The length of the post 12 may be altered by loosening the bolts 58-60 from the openings 54 and 56. If it is desired to change the post length by the incremental distance x or multiple thereof it is merely necessary to slide the outer sleeve 44 lengthwise on the inner sleeve 48 the desired number of openings 50, 52 equal to the total length change desired. By the present invention it is also possible to adjust the length by an additional increment equal to one-half the distance x. This is achieved by extending the members 44, 48 as described and then rotating the outer sleeve 180° and moving the sleeve lengthwise until fasteners 58 and 60 align with the next adjacent pair of openings 50-52. (It will be apparent that the latter adjustment may be to subtract as well as to add the partial increment.)

It is to be noted that when the post length is thus changed by an increment of one-half x, the orientation of the visual indicator 18 remains relatively unchanged because the view openings 22, 24 in housing 20 are also in 180° opposition.

What is claimed is:

1. An improved post for mounting and connecting an above ground indicator to a buried valve, said post comprising:
    an inner tubular member connectible to one of said indicator and said valve;
    an outer tubular member telescopingly fitted upon said inner tubular member and connectible to the other of said indicator and said valve;
    two sets of equispaced openings longitudinally aligned along one of said inner and outer tubular members, said sets of openings being oppositely arrayed on said one tubular member and staggered so as to uniformly longitudinally space successive openings of said two sets; and
    two fastening means oppositely arrayed on the other of said inner and outer tubular members said two fastening means being longitudinally spaced so as to be engagable with any two successive openings on said one tubular member whereby to adjustably fix the length of the post.

2. The post of claim 1 wherein said inner and outer tubular members are cylindrical so as to be rotatable with respect to one another.

3. In an underground valve assembly including a valve adapted to be buried underground, a valve actuator for opening and closing said valve and being accessible from ground level, and a valve position indicator located above ground level having means for indicating the open and closed positions of said rotary valve, the improvement comprising:
    a telescoping tubular post for supporting said valve position indicator above ground level;
    said telescoping tubular post including an inner cylindrical tubular member mounted on said valve and an outer cylindrical member telescopingly disposed on said inner cylindrical tubular member and supporting said valve position indicator;

a first set of a plurality of longitudinally aligned openings having the centers thereof predeterminately spaced a given distance on said inner cylindrical tubular member;

a second set of a plurality of longitudinally aligned openings having the centers thereof equispaced to the opening centers of said first set provided on said inner cylindrical tubular member;

said first set of openings and said second of openings being angularly displaced 180° and being lengthwise staggered relative to each other so that the centers of the openings of one set lies midway the centers of said openings of the other set whereby the centers of said openings of said first and second sets are staggered lengthwise a distance equal to one-half said given distance;

a first fastener opening provided in said outer cylindrical tubular member;

a second fastener opening provided in said outer tubular member;

said second fastener opening being angularly spaced 180° from said first fastener opener and having the centers thereof lengthwise spaced a distance equal to one-half said given distance;

fastening means in said first fastener opening and said second fastener opening insertable into adjacent staggered ones of said openings of said first and second sets of openings for retaining said valve position indicator at a desired level above the ground;

said telescoping tubular post being adjustable in increments of length equal to said given distance when said outer cylindrical tubular member is moved solely lengthwise relative to said inner member and adjustable to a partial incremental distance of one-half said given distance when said outer cylindrical tubular member is rotated 180° and displaced to the next accent openings in the inner tubular member; and telescoping indicator actuating means coaxially disposed within said telescoping tubular post and extending between said rotary valve for transmitting movement of said rotary valve to said valve position indicator.

4. The invention as defined in claim 3 wherein said telescoping indicator actuating means comprises a pair telescoping members of rectangular cross section.

5. The invention as defined in claim 4 wherein one of said pair of telescoping members is a rectangular bar and the other of said telescoping member is of tubular form and is slidable on said bar.

* * * * *